Nov. 2, 1965  F. R. GOLDAMMER  3,216,008
BINARY DATA TRANSMITTING APPARATUS
Filed Dec. 18, 1962
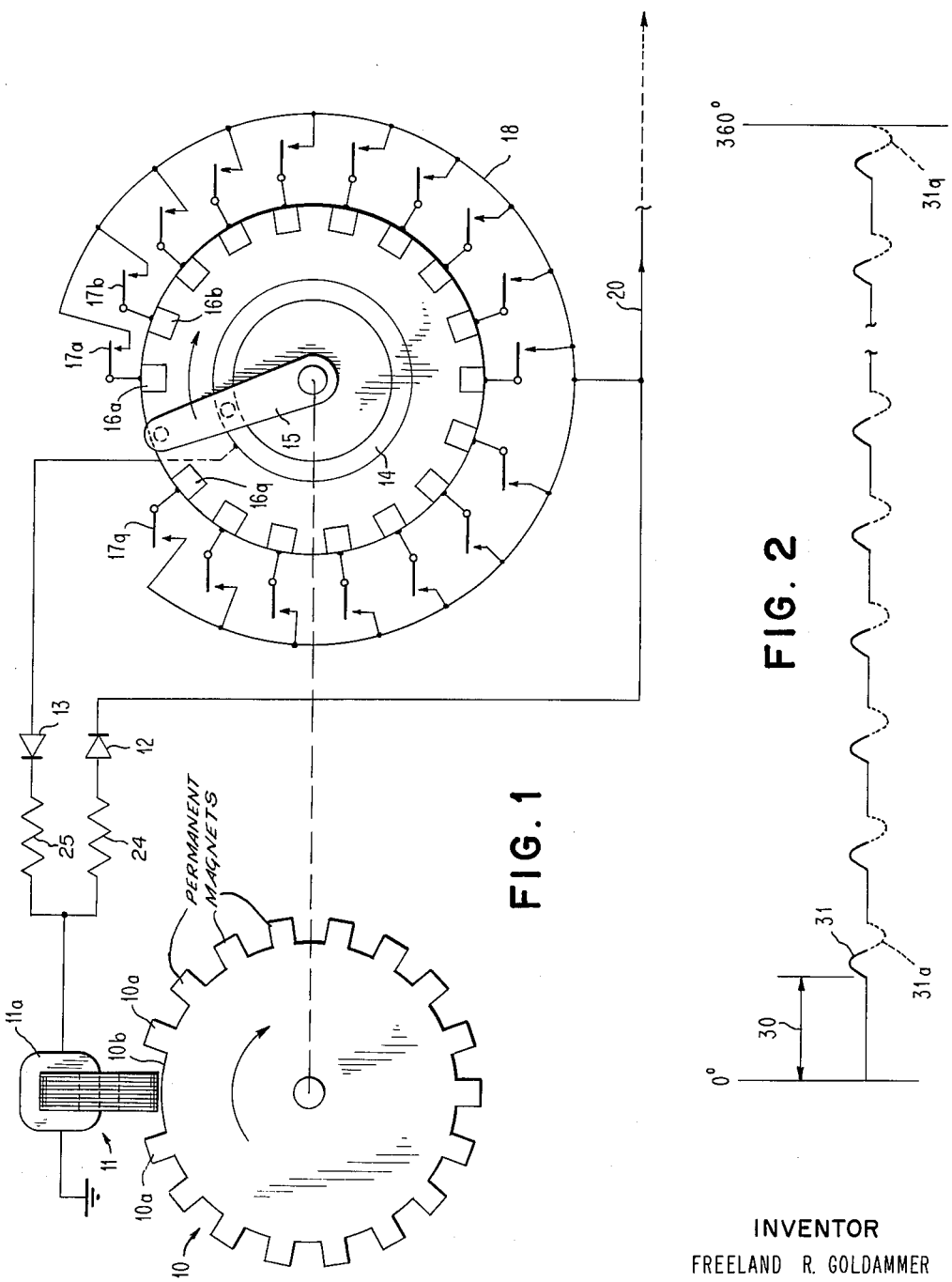
INVENTOR
FREELAND R. GOLDAMMER
BY *Robert E. Sandt*
AGENT United States Patent Office 3,216,008
Patented Nov. 2, 1965

3,216,008
BINARY DATA TRANSMITTING APPARATUS
Freeland R. Goldammer, Yorktown Heights, N.Y., assignor to International Business Machines Corporation, New York, N.Y., a corporation of New York
Filed Dec. 18, 1962, Ser. No. 245,507
3 Claims. (Cl. 340—365)

This invention relates to communication apparatus and more particularly to a data transmission apparatus for generating data significant pulses interlaced with clock pulses.

In the telegraph art, or in the field of binary data communication in general, the classic approach is to synchronize the data receiver to the transmitter in each cycle of operation or to provide a master synchronizer to which both the transmitter and receiver are slaved to provide the necessary synchronization. Through use of the instant transmitter, the conventional start-stop mode of telegraph operation is obviated, as is the need for speed synchronization between the transmitter and receiver, in that the transmitted signal itself contains synchronizing components, as well as data significant components.

It is, therefore, an object of this invention to provide an improved data transmitting apparatus for generating a succession of data significant signals together with timing signals.

A further object is to provide a data transmitter for producing on a common transmission line a succession of time-spaced clocking pulses of a first polarity interlaced with data significant pulses of opposite polarity, wherein the relativity of the data pulses to the clocking pulses manifests the data to be transmitted.

A final and specific object is to provide a data transmitter in accordance with the foregoing objects wherein a succession of magnetic members is moved with uniform velocity passed a single magnetic transducer to produce a succession of bi-polar pulses which are separated into their positive and negative components by respective unidirectional current conducting devices, the pulses of a first polarity being connected to the transmission line and those of the opposite polarity being connected through an electrical commutator to the line, the electrical commutator having a switch element associated with each terminal thereof to select which of the pulses of the second polarity shall be connected to the line.

The foregoing and other objects, features and advantages of the invention will be apparent from the following more particular description of a preferred embodiment of the invention, as illustrated in the accompanying drawings:

FIG. 1 constitutes a mechanical and electrical schematic showing of the operation of the invention.

FIG. 2 is a timing diagram showing the operation of the invention.

In FIG. 1 the toothed wheel 10 is rotated at substantially constant speed by means (not shown), as for example, a synchronous motor powered by the commercial 60 cycle regulated power supply. The wheel 10 is formed with a succession of evenly spaced teeth 10a which teeth are permanently magnetized in the same polarity sense. A predetermined number of the teeth 10a are eliminated to form a gap 10b of one or more missing teeth.

A magnetic sensing head 11 having an air gap through which each magnetized tooth 10a passes in succession produces a bipolar signal in the winding 11a thereof upon the passage of each tooth 10a through the gap. Alternatively, the teeth 10a may be fabricated of a magnetic material, but not permanently magnetized and the head 11 has a bias winding thereon to provide the requisite bi-polar pulse as the reluctance of the magnetic circuit changes upon the passage of each tooth through the gap. The permanently magnetized teeth are, however, preferred, as no power supply is required.

The bi-polar signal from the winding 11a on the sensing head 11 is divided into positive and negative signals by the oppositely poled diodes 12 and 13, the resistors 24 and 25 being serially connected therewith to the common connection to the coil 11a. The positive-going pulses through diode 12 are transmitted directly to the transmission line 20. The negative pulse from diode 13 is directed to the common terminal 14 of a commutator device having an arm 15 rotating on the same shaft as is the disc 10.

The rotating arm 15 has sliding electrical contact with the arcuate common conductor 14 by means of a brush, or other sliding contactor, and an intermittent contact with each successive one of the fixed contacts 16a through 16q, there being one fixed contact 16 for each tooth 10a in the wheel 10, and the relative angular relationship of each fixed contact and the teeth in the wheel is identical. So also is the angular relationship of the arm 15 relative to the commutator segments identical to the relationship of the wheel 10 with respect to the sensing head 11.

Each individual commutator segment has associated therewith a switch 17, which when closed, connects the commutator segment to the line 20 by means of the commoning line 18. Thus, during each revolution of the wheel 10 the dipole signal generated by each tooth will have the positive portion thereof directed to the signal line 20 and the negative portion to the commutator. If the switch corresponding to the instantaneous position of the commutator arm is closed, then the negative pulse will appear on the line 20 following its positive mate. Thus, each data pulse from the commutator will be preceded by a positive clock pulse, so that a receiver on the other end of the line 20 will be able through the clock pulses to apportion the data pulses to their proper hierarchal significance. The switches 17a through 17q may be operated from any source, as for example, they may be reporting the operating status of machines on a production floor to a central office. They may also be manually controlled to transmit a binary-coded message, or by a computer or other automatic device.

The timing of the signals produced on the line 20 is shown in FIG. 2. The lack of any signals during the period 30 represents the void 10b on the wheel 10. Following this void each tooth 10a produces its dipole signal which is shown on the diagram as a solid positive sinusoidal loop joined to a dotted negative loop. The dotted showing connotes that the negative loop may be selectively transmitted depending on the status of the switches 17a through 17q. Any one or more or none of these switches may be closed in all combinations, as should be apparent.

The void 30 in the transmission of pulses permits a receiver at the other end of the line 20 to detect the absence of clocking pulses for one or more points in the cycle and to reset. When the first clocking pulse 31 is then received the receiver is stepped thereby to its first operating position to direct the data pulse 31a (if it is received) to the appropriate data significant channel. Each successive clock pulse steps the receiver by one step. By virtue of this clock pulse void for at least one cycle point, the receiver will always be rephased with the transmitter during each cycle, to obviate malfunction due to line breaks, power failures, or other causes. Although the transmitter is normally run at synchronous speed, this is not necessary, as the clock pulses will step the receiver for each pulse received. The only requisite is that the transmitter rotate reasonably consistently so that the void 30 will not be confused with a signal lack due to non-rotation of the transmitting apparatus.

While the invention has been particularly shown and described with reference to a preferred embodiment thereof, it should be understood by those skilled in the art that various changes in form and details may be made therein without departing from the spirit and scope of the invention.

What is claimed is:
1. A data transmission apparatus comprising:
   (a) signal generating means for generating a succession of bi-polar electrical signals;
   (b) a pair of unidirectional current conducting devices connected to said signal generating means in opposite conductivity relationship, whereby the positive portion of said bipolar signals will be passed by a first of said pair of unidirectional current conducting devices and the negative portion passed by the second of said pair of devices;
   (c) a transmission line connected to the first of said pair of devices,
   (d) and means connected between the second of said pair of devices and said transmission line and operative synchronously with said signal generating means to selectively pass to said transmission line predetermined ones of the negative portions of said bi-polar signals to said transmission line.
2. A binary data transmitter comprising:
   (a) means for producing a succession of bi-polar electrical signals:
   (b) means for segregating said bi-polar signals into their respective positive and negative component pulses;
   (c) a transmission line;
   (d) means for conecting the segregated positive pulses to said transmission line;
   (e) and means for selectively connecting predetermined ones of said segregated negative pulses to said transmission line, whereby the positive pulses operate as a time base reference to provide data significance to those of the negative pulses which are selectively transmitted.
3. A binary data transmitter comprising:
   (a) a member having a plurality of spaced permanent magnets;
   (b) a magnetic sensing head having a non-magnetic gap and a signal winding thereon;
   (c) means for moving said member such that each permanent magnet thereon passes successively through the non-magnetic gap in said head to produce a succession of bi-polar electrical responses in said signal winding;
   (d) a forward conducting and a reverse conducting unidirectional current conducting device connected to said signal winding to segregate the positive and negative portions of said bi-polar signals;
   (e) a transmission line connected to the forward conducting unidirectional current conducting device;
   (f) an electrical distributor actuated by the means for moving said member, and having a common input terminal connected to said reverse conducting unidirectional current conducting device and having a plurality of output terminals, one for each of said permanent magnets, successively connected to said input terminal in synchronism with the passage of each of said magnets past said sensing head;
   (g) and a switch connecting each of said output terminals with said transmission line.

No references cited.

NEIL C. READ, *Primary Examiner.*